Jan. 15, 1957 W. T. ROSSELL 2,777,401
AXLE CONTROLLED TRUCK
Filed March 16, 1955 2 Sheets-Sheet 1
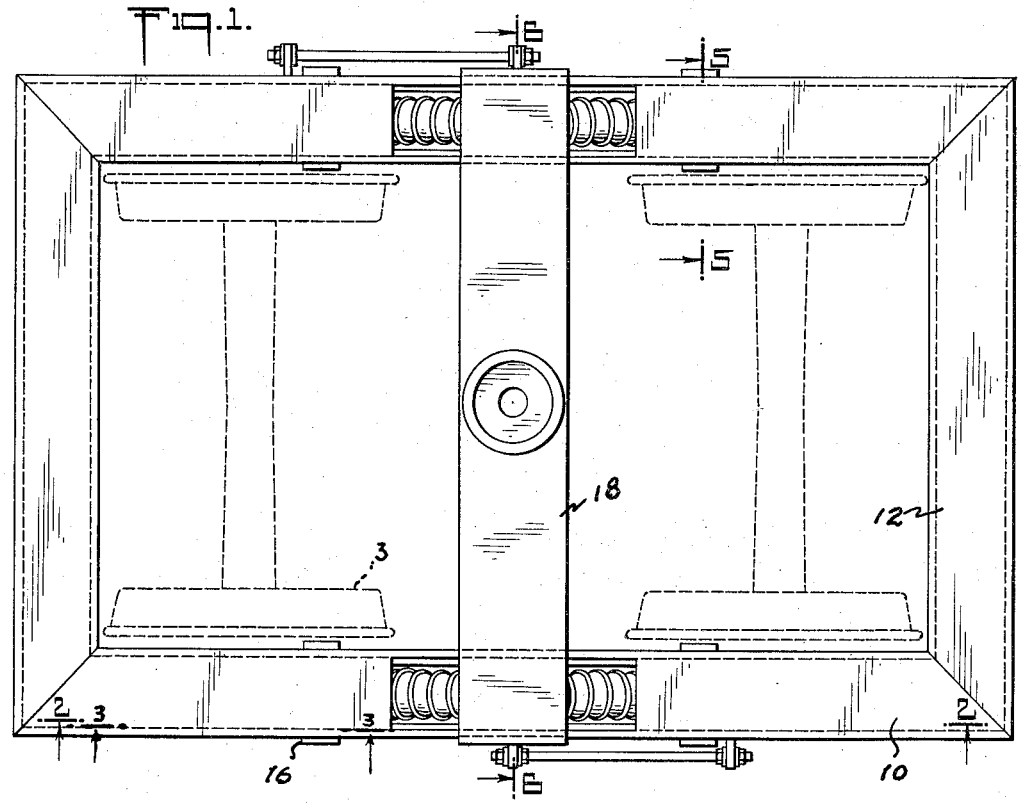
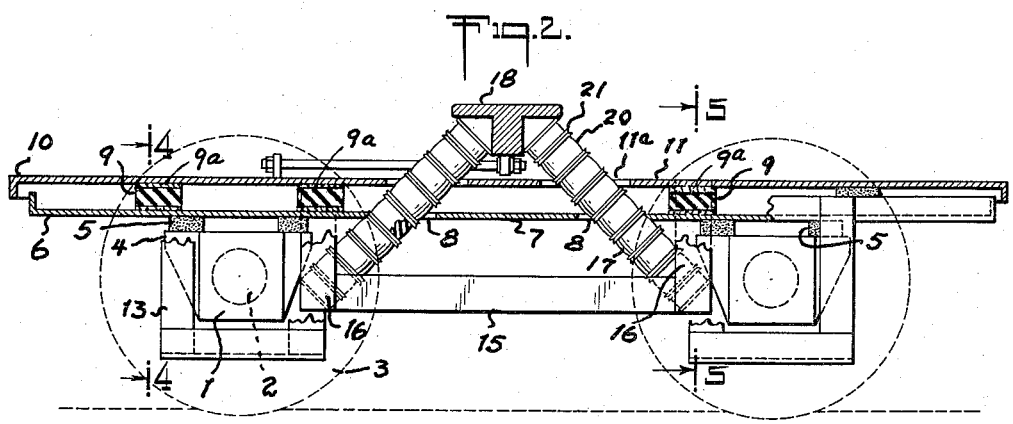
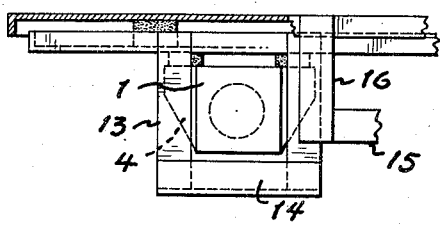
INVENTOR
WILLIAM T. ROSSELL
BY
ATTORNEY

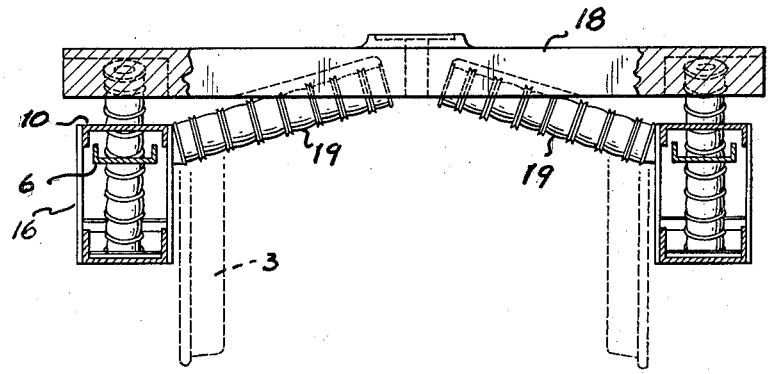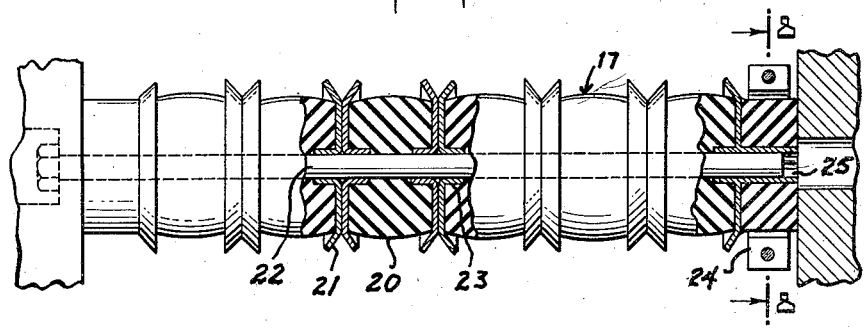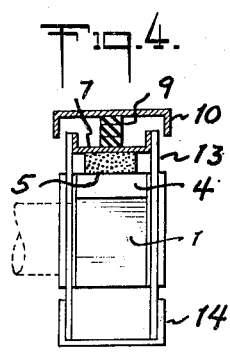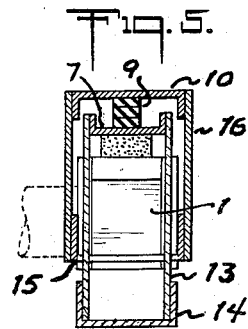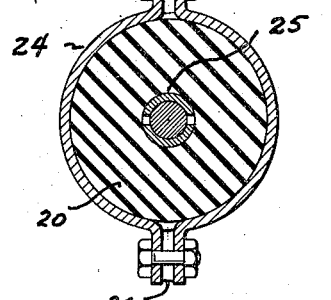

United States Patent Office 2,777,401
Patented Jan. 15, 1957

2,777,401

AXLE CONTROLLED TRUCK

William T. Rossell, New York, N. Y., assignor to Transit Research Corporation, New York, N. Y., a corporation of New York Application March 16, 1955, Serial No. 494,736

9 Claims. (Cl. 105—197)

This invention relates to rail trucks and has for its object to provide a truck which will give improved riding quality, which will have improved safety factors for high speed operation and which can be manufactured at less cost than conventional trucks intended for similar service.

More particularly, it is an object of the invention to provide a truck frame and journal bearing relation which will break up all harmonic motions which would lead to or permit hunting, hunting being a principal source of poor riding quality. If the axles of a rail truck are maintained rigidly parallel the wheels will de-rail. If the axles are free to seek various angular relations with each other the truck will hunt. If these free relations are restrained by springs such as rubber pads, the hunting may be reduced but it cannot thus be eliminated. According to my invention the axles are free to vary their relative angular positions, within limits permitted by the structure, but every change in the relative angular position is resisted by friction. Furthermore, the frictional means of one axle are connected to the frictional means of the other axle so that the force causing any movement of either axle is felt by the frictional assembly at the journal of the other axle. And, the force imposed on the frictional means varies with the loading on the journals. The tendency of the supporting wheels to follow the harmonic of a sine wave therefore becomes impossible and hunting is thus eliminated.

Another object of the invention is to provide a truck having two frames, in the interests of improved riding quality and improved safety. It has been found that when two frames are provided in conventional trucks that the upper frame usually can find resonance with the rail joints and set up a resultant vibration which is then transmitted to the car body causing discomfort. This vibration often becomes so pronounced that the upper frame actually strikes the bottom of the car body. I have found that this can be remedied by separating the two frames by springs having a natural frequency such that there can be no resonance with the rail joints at any speed at which the trucks are intended to operate, for instance 150 miles per hour, and to design the bolster supporting springs for all required major deflections.

Another object is to provide a truck in which all springing is done by rubber springs. Such springs have high hysteresis, as compared with coil springs, and hence naturally reduce the need for additional snubbing. As will be hereinafter described in detail, the rubber springs are of great length and are so constructed that snubbing means additional to the hysteresis of the rubber are provided as a part of the spring construction.

A further object is to provide additional rubber springing means which participate somewhat in resisting vertical movements of the bolster with respect to its supporting frame but which primarily restrain the lateral swinging of the bolster and which, likewise, contain the additional or auxiliary snubbing means.

With regard to the improved safety of the frames, the construction is such that a portion of the upper frame extends downwardly below the lower frame in order to lower the supporting area of the bolster springs. The lower frame continues straight across to the other axle. Thus, if either frame breaks it will very probably support the broken pieces of the other frame against contact with the rail. This condition does not hold true for the portion of the upper frame residing below the lower frame, so that I therefore place the bolster spring supports at points where the weight imposed is directly below the supports of the upper frame on the lower frame. The weight imposed on the bolster springs therefore does not act through a lever arm with respect to the eventual points of support by the lower frame. The possibility of breaking the bolster spring supporting beam then becomes remote.

The frames and journal bearing supports as here proposed become greatly simplified over conventional construction and may be fabricated at greatly reduced cost, no real precision is required in the construction and there are great savings in weight.

Other objects and advantages will become hereinafter more fully apparent as reference is had to the accompanying drawings in which my invention is illustrated and in which:

Figure 1 is a top plan view of my improved truck,

Figure 2 is a longitudinal vertical section taken along the line 2—2 of Figure 1, Figure 3 is a detail transverse vertical section taken along the line 3—3 of Figure 1, Figure 4 is a transverse vertical section taken along the line 4—4 of Figure 2, Figure 5 is a transverse vertical section taken along the line 5—5 of Figure 2, Figure 6 is a transverse vertical section taken along the line 6—6 of Figure 1, Figure 7 is an enlarged side elevation of a main spring partially in section, and Figure 8 is a diametric section of the main spring taken along the line 8—8 of Figure 7.

More particularly, 1 indicates the journal bearings of a rail truck which house the ends of the axles 2, the axles being supported by wheels 3. The journal bearings are each equipped with flanges 4 at each side thereof which support blocks 5 of friction material. The blocks 5 are anchored to the flanges 4.

Resting freely on the blocks 5 is the lower truck frame 6 composed of trough-like or U-shaped side rails 7 connected by cross members similar to the cross members of the upper frame, to be described. A portion of the bottom of the trough of each side rail is omitted at 8 intermediate the ends of the side rails to permit the bolster springs to pass therethrough.

Near the ends of the side rails 7 and above the friction blocks 5, I place rubber compression springs 9 which support the upper frame 10. This frame is also of trough or inverted U-shape and is composed of the side rails 11 and cross members 12. A portion of each side rail 11 is omitted intermediate its ends at 11a to provide an opening for the bolster springs. This frame 10 completely overlies the lower frame 6. The rubber springs 9 are, in fact, rubber sandwiches with pieces of metal 9a surface bonded to opposite surfaces of each block and each metal piece is dowelled or pinned to the adjacent frame to prevent slippage of the frames with respect thereto.

The lower frame 6 has pedestals 13 extending downwardly therefrom fore and aft and in slightly spaced relation with respect to each journal box 1, the pedestals being connected by a rigidifying member 14 below each journal box. The pedestals permit slight fore and aft movement of the frame 6 on the friction blocks 5 but limit such movement in either direction. They also limit lateral movement of the frame 6 with respect to the journal boxes.

In order to support the bolster springs which are necessarily of considerable length I provide a short beam 15 below and parallel to the side rails of the frames 6 and 10. Each end of each of these beams is connected to the upper frame 10 by straps 16 which are bolted to that frame. These straps 16 are as close to the journal bearing as they can be placed and pass alongside a friction block 5 and a spring 9.

The bolster springs 17 are inclined, one spring seating on the beam 15 at one end thereof and the other seating at the opposite end. A bolster 18 is supported jointly by the springs 17. By placing the straps 16 as described, the weight of the car body as imposed on the bolster acts directly downwardly on the supporting means 5 and 9 and not through any lever arm. The chances of breakage of the beam 15 is thus remote.

As shown in Figure 4, I provide springs 19, similar to the springs 17, to resiliently oppose swinging movements of the bolster 18. These springs 19 seat against the upper frame 10 at their outer ends and against a central area of the bolster at their other ends.

The springs 17 and 19 are best shown in Figures 6 and 7. They are each composed of a stack of blocks 20 of rubber separated by metallic cup retainers 21. Interiorly, the blocks 20 have aligned openings through which a common rod 22 extends. In order to prevent wear on the rubber by the rod each retainer 21 has a thimble bearing 23. The end blocks of the stack are provided with a collar 24 which limits the bulging of the rubber under compressive stresses imposed by the bolster and the body carried thereby. These end blocks also have a split interior lining 25 for their opening, of less than 360° in circumference so that when one end of a spring is moved toward the other end, thus forcing longitudinal movement of the rod 22, the split sleeves will be urged against the rods. The pressure imposed by the sleeves on the rods sets up friction which damps the motion of the springs. If there is too much friction the halves of the collar 24 can be loosened and separated by shims 26 so that the restriction against bulging of the exterior of the enclosed block is relaxed. Either end but not both ends of the rod 22 can be anchored to the supported or supporting member. The split sleeve 25 and the retaining sleeve 24 is placed at the end opposite the point of anchorage of the rod 22.

Various changes may be made without departing from the spirit of my invention and I desire to be extended protection as defined by the appended claims.

What I claim is:

1. In a rail truck a pair of axles each having journal bearings near each end thereof, said bearings each having flanges at each side thereof, friction blocks anchored atop each of said flanges, a lower truck frame resting on said friction blocks, means limiting the possible relative horizontal movements of said frame and said blocks, an upper frame, springs supporting said upper frame on said lower frame, and a bolster springingly supported by said upper frame, said bolster transmitting the loading of a car body substantially equally through the upper frame and the springs separating said frames onto said friction blocks whereby frictional resistance to relative horizontal movements of said axles varies with the loading imposed by the car body.

2. A rail truck comprising a lower frame having its side rails of trough or U-shape, an upper frame having side rails of inverted trough or U-shape springingly supported near its end from said lower frame, the side rails of both of said frames having a substantial portion of the bottoms of their troughs removed intermediate their ends to form bolster spring openings, a bolster supporting construction of U-shape in side elevation supported by said upper frame, bolster springs supported by said construction and extending upwardly through the openings in the side rails of both of said frames and a bolster supported by said springs.

3. A rail truck comprising a lower frame having its side rails of trough or U-shape, an upper frame having side rails of inverted trough or U-shape springingly supported near its end from said lower frame, the side rails of both of said frames having a substantial portion of the bottoms of their troughs removed intermediate their ends to form bolster spring openings, a bolster supporting construction comprising a short beam paralleling said side frames and residing substantially therebelow and vertical straps extending from the outer ends of said beam to said upper frame for rigid connection thereto, spring seats at each end of said beam, inclined bolster springs resting in said seats and extending upwardly through the openings in said frames, and a bolster supported by said inclined springs.

4. A rail truck comprising a lower frame having its side rails of trough or U-shape, an upper frame having side rails of inverted trough or U-shape springingly supported near its end from said lower frame, the side rails of both of said frames having a substantial portion of the bottoms of their troughs removed intermediate their ends to form bolster spring openings, a bolster supporting construction comprising a short beam paralleling said side frames and residing substantially therebelow and vertical straps extending from the outer ends of said beam to said upper frame for rigid connection thereto, spring seats at each end of said beam, said straps residing opposite at least one of the springs at each corner of the truck which supports the upper frame from the lower frame, said straps being vertical whereby said bolster spring seats reside vertically below the supports of said upper frame, inclined bolster springs resting in said spring seats and extending upwardly through the openings in said frames and a bolster supported jointly by said springs.

5. A rail truck comprising axles having journal bearings, said bearings having flanges at each side thereof, a lower frame, friction blocks atop each of said flanges jointly supporting said lower frame, means limiting maximum relative movements of said frame and said journal bearings on said blocks, an upper frame, rubber compression springs located vertically above said friction blocks supporting said upper frame from said lower frame, said frames having openings therethrough intermediate their ends for the accommodation of bolster springs, bolster spring supports comprising a short beam paralleling and residing below the side rails of said frames and straps rigidly connecting the ends of said beam with said upper frame, said straps each being vertical and passing alongside one of said friction blocks and one of said compression springs, spring seats at the juncture of said straps and said beam at each end of said beam, inclined bolster springs resting in said spring seats and extending upwardly through said frames, and a bolster supported by said inclined springs.

6. A rail truck comprising an upper frame and a lower frame separated near their corners by rubber compression blocks, a bolster spring support at each side of the frames comprising a short beam parallel to and vertically below said frames having straps supporting said beam from said upper frame, spring seats at each end of said beam, inclined springs resting in said seats, a bolster supported by said springs, and additional inclined springs resting at their lower ends against the side rails of said upper frame at opposite sides of the truck and seated against said bolster at their upper ends, said additional springs resisting lateral swinging movements of said bolster with respect to said frame.

7. A rail truck comprising an upper frame and a lower frame separated near their corners by rubber compression blocks, a bolster spring support at each side of the frames comprising a short beam parallel to and vertically below said frames having straps supporting said beam from said upper frame, spring seats at each end of said beam, inclined springs resting in said seats, a bolster supported by said springs, and additional inclined springs resting at their lower ends against the side rails of said upper frame at opposite sides of the truck and seated against said bolster at their upper ends, said additional springs resisting lateral swinging movements of said bolster with respect to said frame, said inclined springs each being composed of a stack of rubber blocks and means for preventing said stack from buckling.

8. A rail truck comprising an upper frame and a lower frame separated near their corners by rubber compression blocks, a bolster spring support at each side of the frames comprising a short beam parallel to and vertically below said frames having straps supporting said beam from said upper frame, spring seats at each end of said beam, inclined springs resting in said seats, a bolster supported by said springs, and additional inclined springs resting at their lower ends against the side rails of said upper frame at opposite sides of the truck and seated against said bolster at their upper ends, said additional springs resisting lateral swinging movements of said bolster with respect to said frame, said inclined springs each being composed of a stack of rubber blocks and all having aligned openings centrally therethrough, and a rod extending through all of said openings to prevent buckling thereof, said rod being free to move at its ends whereby it offers no interference to compression and expansion of said blocks under loading.

9. A spring comprising a plurality of blocks of rubber stacked upon each other, said blocks having aligned openings therethrough and a common rod extending through said openings, a split sleeve of less than 360° separating said rod and at least one of said blocks, a collar encircling the block containing the split sleeve in order to prevent bulging of that block upon compression of said spring and said block whereby the compressive force causes said split sleeve to grip said rod and frictionally to resist movement of said rod in said sleeve.

References Cited in the file of this patent

UNITED STATES PATENTS

| 450,627 | Krebiel | Apr. 21, 1891 |
| 1,226,756 | Dougherty | May 22, 1917 |
| 1,484,954 | Masury | Feb. 26, 1924 |

FOREIGN PATENTS

| 131,738 | Sweden | May 22, 1951 |